Jan. 28, 1941.   W. W. RABEY   2,230,090
VEHICLE-COMBINATION ROAD AND RAIL
Filed June 8, 1939   2 Sheets-Sheet 2
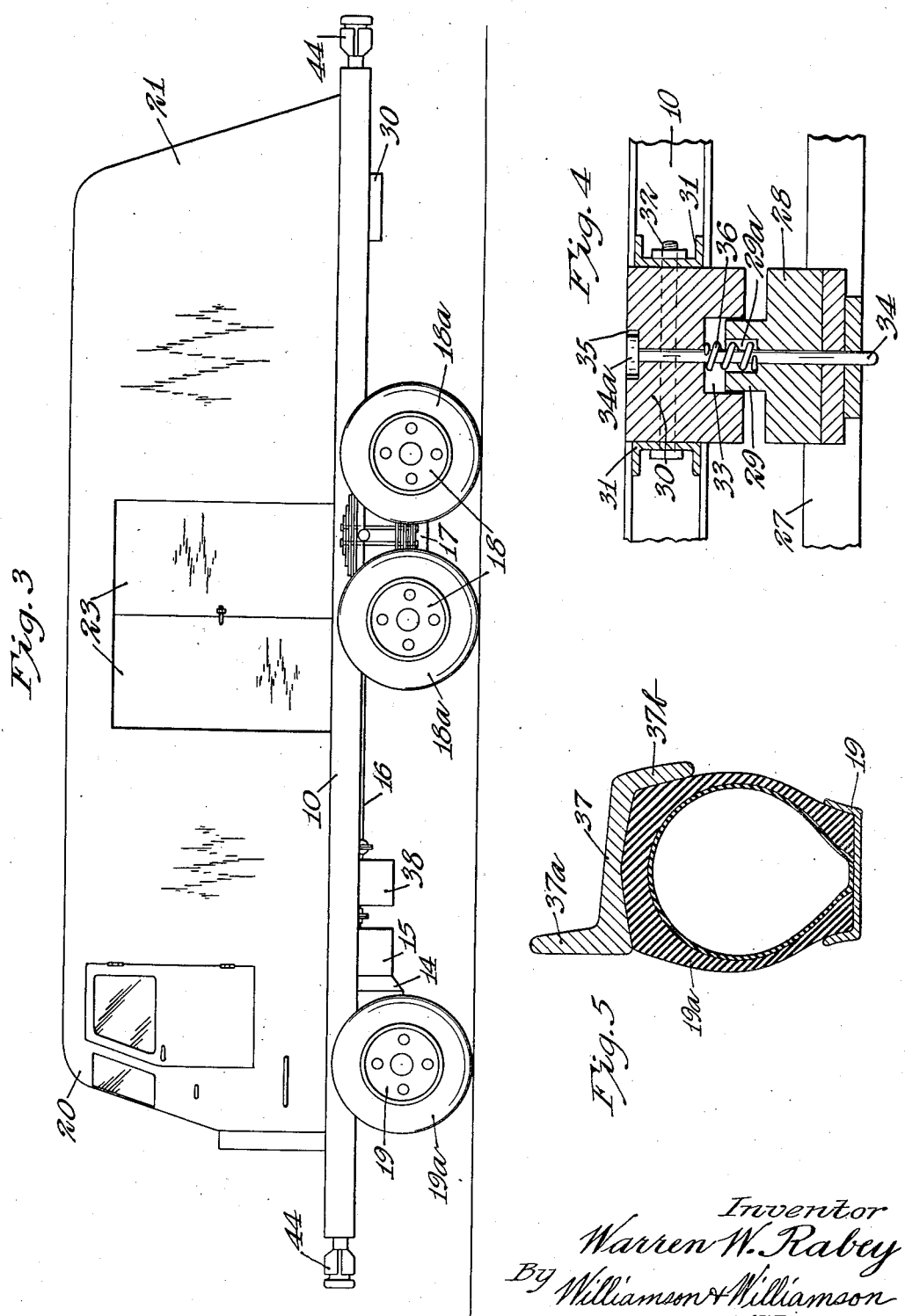
Inventor
Warren W. Rabey
By Williamson & Williamson
Attorneys Patented Jan. 28, 1941

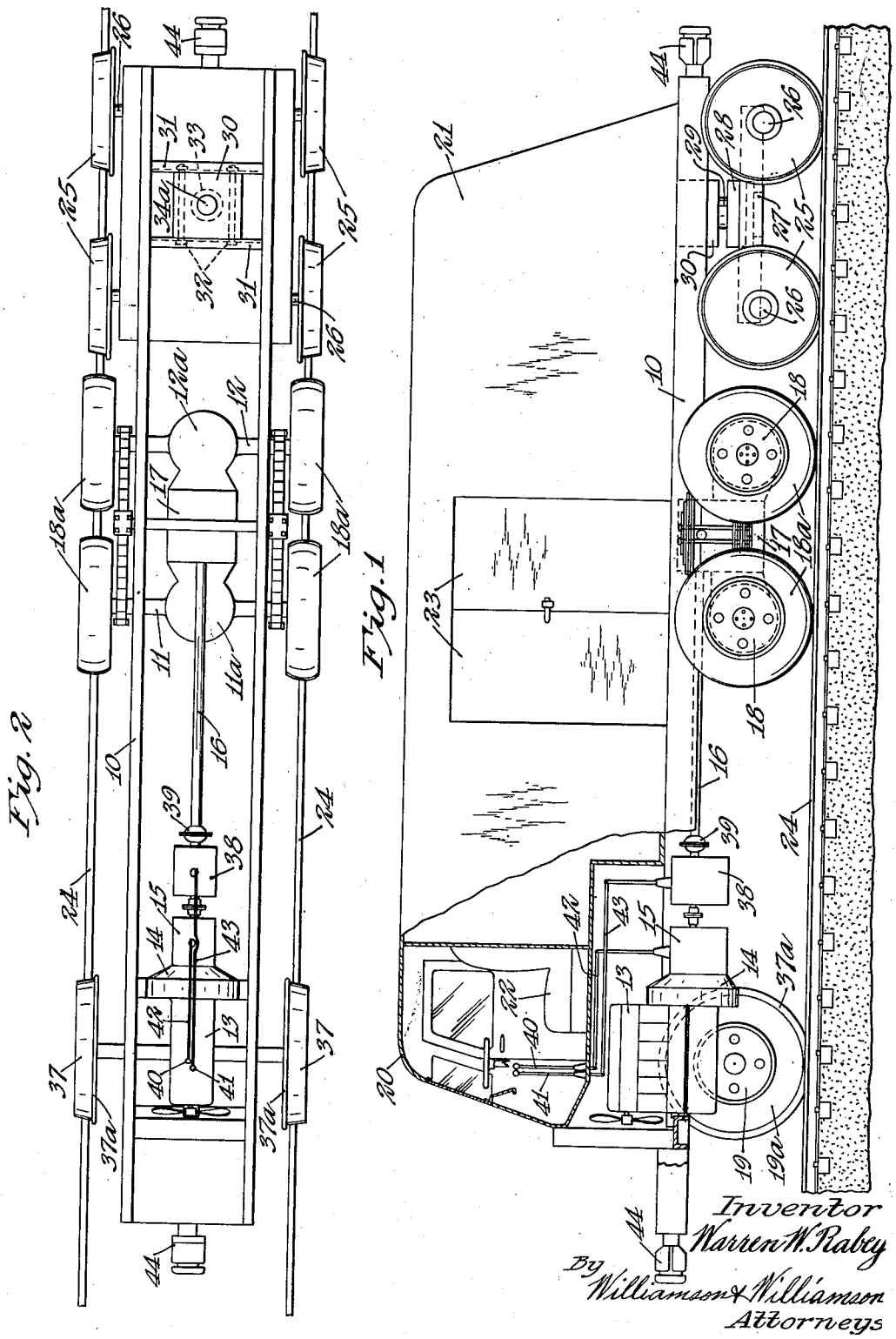

2,230,090

UNITED STATES PATENT OFFICE 2,230,090

VEHICLE—COMBINATION ROAD AND RAIL

Warren W. Rabey, Long Lake, S. Dak., assignor of ten per cent to Ruth Rosholt, Minneapolis, Minn.

Application June 8, 1939, Serial No. 278,106

6 Claims. (Cl. 105—215)

My invention relates to vehicles and particularly to an automotive vehicle operable either on highways or on railroad tracks.

In connection with short line or branch line railroads which operate over relatively short distances and carry relatively light traffic, there is a need for the utmost operating economy. In operation of such railroads it is believed that an internal combustion engine vehicle capable of operating as a locomotive on railroad tracks and as a truck on streets and highways would afford distinct advantages in first cost, economy in operation, economy in maintenance and flexibility of operation.

An object of my invention is to provide an internal combustion engine driven vehicle capable of operating as a locomotive on a railroad track and as a truck on a street or highway.

Another object is to provide such a vehicle which is capable of rapid and easy conversion from an arrangement thereof enabling rail operation to an arrangement enabling road operation and vice versa.

Still another object is to provide such a vehicle wherein the rubber tires of the driving wheels may be used not only in the usual manner on a road but also for rolling engagement with the rails of a railroad track for tractive purposes and for partial support of the vehicle and its cargo.

Yet another object is to provide such a vehicle having a quickly and easily removable flanged wheeled pilot truck arranged for so guiding the vehicle as to prevent sideward shifting of the driving wheels off of a railroad track.

Another object is to provide such a vehicle wherein the pilot truck is so associated with the vehicle as to support little or none of the weight thereof in order to enable the driving wheels to utilize weight of the vehicle borne thereby to enable procurement of ample tractive effect.

Another object is to provide such a vehicle having a quickly and easily removable rigid flanged tire mounted on the peripheries of the front tires of the vehicle for use when the vehicle is arranged for travel over a railroad track.

Still another object is to provide such a vehicle having change-gear transmission equipment enabling the vehicle to be operated both forwardly and rearwardly with a full range of gear ratios available in either case and with particularly flexible capabilities as to the number of gear ratios available.

A further object is to provide such a vehicle of relatively simple, light, compact and inexpensive construction.

These and further objects of the invention will more fully appear from the following description made in connection with the accompanying drawings, wherein like reference characters refer to the same parts throughout the views, and, in which:

Fig. 1 is a side view of an embodiment of my invention as it appears when arranged for travel over a railroad track, certain parts being broken away to show details;

Fig. 2 is a top view of the vehicle of Fig. 1 with the body and cab thereof removed to show the construction of the chassis;

Fig. 3 is a side view of the vehicle when the same is arranged for travel on a street or highway;

Fig. 4 is a vertical sectional detail view showing the construction of parts by which the pilot truck is removably connected to other parts of the vehicle; and Fig. 5 is a cross-sectional view of a portion of one of the pneumatic front wheel tires with the flanged rigid tire mounted thereon.

Referring to the drawings, my vehicle is comprised in part of a motor truck including a frame 10, twin rear axles 11 and 12, an internal combustion engine 13, a clutch 14 and change-gear transmission 15, a drive shaft 16 connected to the differentials 11a and 12a of the two rear axles 11 and 12 through a gear box 17, rear wheels 18 carrying pneumatic rubber tires 18a, and front wheels 19 carrying pneumatic rubber tires 19a. All of these parts and minor parts associated therewith or contained therewithin are of conventional construction and hence should require no detailed description for the purposes of this application.

On the frame 10 of the vehicle I provide an operator's cab 20 and a cargo containing enclosure or body 21. The cab 20 contains an operator's seat 22 and the usual control equipment found in any conventional motor truck. The body 21 is provided with suitable doors which may be arranged and located in the manner of the doors 23 shown in Fig. 1.

The construction included in the foregoing description is obviously sufficient to enable my vehicle to be operated over streets and highways in the manner of an ordinary motor truck. The use of my vehicle on the rails of a railroad track and the special features of construction which enable such use will now be described.

In operation of my vehicle on railroad tracks the tires 18a of the rear or driving wheels 18 of the vehicle rest upon the rails of the tracks in the manner in which the tires 18a are shown associated with rails 24 in Figs. 1 and 2 of the drawings. To so guide the vehicle that the tires 18a will not shift sidewardly sufficiently to leave the rails 24 I provide a pilot truck including flanged wheels 25, axles 26 on which the wheels 25 are mounted, and a pilot truck frame 27 carried by the axles 26. A block 28, substantially centrally located on the pilot truck, is suitably secured to the top of the pilot truck frame 27. An upstanding cylindrical boss 29 is formed on the upper side of the block 28 in centrally located relation therewith.

Above the block 28 a block 30 is secured to cross-pieces 31 built into the frame 10 of the vehicle. The cross-pieces 31 may be made of channel steel as desired and the block 30 may be secured thereto by suitable means such as the bolts 32. The lower side of the block 30 is provided with a downwardly opening cylindrical recess 33 into which the upper portion of the boss 29 projects in closely fitting journalled relation with the portions of the block 30 defining the lower portion of the recess 33. The blocks 28 and 30 are located at such levels that there is a substantial space therebetween and the height of the boss 29 and depth of the recess 33 are so selected that there is a substantial clearance between the top of the boss 29 and the portion of the block 30 defining the upper end of the recess 33 when the tires 18a and pilot truck wheels 25 are resting on the rails 24. This space and clearance are provided to place the weight of the rear end of the vehicle on the tires 18a instead of on the wheels 25 so as to produce ample pressure of the tires 18a on the rails 24 for the purpose of obtaining effective traction.

The blocks 28 and 30 are vertically apertured on the axis of the boss 29 and recess 33 to receive a pin 34 as shown in Fig 4. The pin 34 is provided with a head 34a and the top of the block 30 is provided with a recess 35 in which the head 34a is received. The upper end of the boss 29 is provided with an upwardly opening recess 29a. A helical compression spring 36 is placed in encircling coaxial relation with the medial portion of the pin 34 with the respective ends of the spring bearing against the portions of the blocks 28 and 30 defining the inner ends of the respective recesses 29a and 33.

The pilot truck may be relatively quickly and easily disconnected and removed from the vehicle by jacking up the rear end of the vehicle enough to bring the bottom of the block 30 above the upper end of the boss 29 and removing the pin 34 after which the pilot truck may be rolled rearwardly away from the vehicle along the track rails 24.

I provide means whereby the front wheels of the vehicle may be adapted for running on railroad track rails such as the rails 24. For this purpose I provide a rigid tire 37 mounted on the periphery of the pneumatic tire 19a of a front wheel 19 of my vehicle. The rigid tire 37 is provided at its inner edge with a rail-engaging flange 37a and has an external periphery diminishing in diameter away from the vehicle so as to have substantially the same external shape as an ordinary railroad car wheel. The internal periphery of the tire 37 in somewhat arched in a direction parallel to the axis of the tire 37 so as to receive the periphery of the pneumatic tire 19a and very tightly grip the same when the pneumatic tire 19a is fully inflated. When the pneumatic tire 19a is at least partly deflated the rigid flanged tire 37 may be easily slipped on or off the peripheral portion of the pneumatic tire 19a. As a further means of preventing the rigid tire 37 from shifting outwardly on the pneumatic tire 19a due to the tapering outside diameter of the rigid tire 37, an inwardly projecting flange 37b is formed on the rigid tire 37 at its inner edge in position to abut the side wall of the pneumatic tire 19a nearest the vehicle.

In use of my vehicle on railroad tracks it is essential that various speeds be available for both forward and rearward directions of movement of the vehicle and that all available speeds be useable regardless of the direction of movement. I provide change-gear transmision means to enable such operation by interposing an additional change-gear transmission unit 38 between the transmission unit 15 carried by the motor 13 and the drive shaft 16. The additional transmission unit 38 may be a conventional unit providing for several speeds forward and at least one speed reverse and may be identical to the transmission unit 15 or not as desired. The end of the transmission unit 38 which in conventional use of the same would be connected to a driveshaft is instead connected to the end of the transmission unit 15 which would ordinarily be connected to a driveshaft. The end of the transmission unit 38 which would ordinarily be connected to the clutch of a motor vehicle is connected to the forward end of the drive shaft 16 by suitable means such as the universal joint 39. In the operator's cab two gear-shift levers 40 and 41 are provided for controlling the respective transmission units 15 and 38. Mechanisms connecting the levers 40 and 41 to the respective transmission units 15 and 38 are represented more or less diagrammatically by the members 42 and 43. The detailed arrangement of these mechanisms is not shown since this is merely a matter of routine design and does not constitute an inventive feature of my vehicle. The use of two transmission units in "back to back" relation as described above and illustrated enables great flexibility in the operation of my vehicle and provides the same speeds in one direction as in the other direction. For example, using a pair of identical transmission units each arranged for three speeds forward and one speed reverse, seven gear ratios for forward movement and six gear ratios for rearward movement are available. The various ratios are obtained, of course, by placing the gear-shift levers 40 and 41 in various suitable combinations of respective positions thereof.

When my vehicle is operated on rails the same is capable not only of carrying a cargo within the body 21 thereof but also of functioning as a locomotive to draw a train of standard railway freight cars. To enable connection with such freight cars I provide conventional railway automatic couplers 44 attached to the respective ends of the frame 10 of the vehicle.

When my vehicle is operated on rails the steering gear is so positioned as to dispose the front wheels in planes substantially parallel to the longitudinal axis of the vehicle. If the steering system is not of the irreversible type or if so desired the steering system may be locked by any suitable means.

It should be apparent that I have invented a novel form of combination road and rail vehicle capable of particularly flexible operation and especially easily convertible from the road traveling to the rail traveling arrangement thereof.

It will, of course, be understood that various changes may be made in the form, details, arrangement and proportions of the various parts without departing from the scope of my invention.

What is claimed is:

1. A rail vehicle including, a motor truck having the usual rubber tired driving wheels spaced apart laterally to roll upon a pair of rails, a flanged wheeled pilot truck disposed closely adjacent said driving wheels and toward one end of said motor truck therefrom for travel on rails on which said driving wheels are supported, and means connecting said pilot truck to said motor truck for swiveling action about a vertical axis disposed substantially centrally of said pilot truck and permitting vertical displacement of said pilot truck relative to said motor truck whereby none of the weight of said motor truck will be supported from said pilot truck.

2. A combination rail and highway vehicle including, a motor truck having the usual rubber tired driving wheels spaced apart laterally to roll upon a pair of rails, a flanged wheeled pilot truck disposed closely adjacent said driving wheels and toward one end of said motor truck therefrom for travel on rails on which said driving wheels are supported, and means connecting said pilot truck to said motor truck for swiveling action about a vertical axis disposed substantially centrally of said pilot truck, said means being releasable to permit removal of said pilot truck from association with said motor truck.

3. A combination rail and highway vehicle including, a motor truck having the usual rubber tired driving wheels spaced apart laterally to roll upon a pair of rails, a flanged wheeled pilot truck disposed closely adjacent said driving wheels and toward one end of said motor truck therefrom for travel on rails on which said driving wheels are supported, and vertically axised bearing means connecting said pilot truck to said motor truck for swiveling movement relative thereto.

4. A combination rail and highway vehicle including, a motor truck having the usual rubber tired driving wheels spaced apart laterally to roll upon a pair of rails, a flanged wheeled pilot truck disposed closely adjacent said driving wheels and toward one end of said motor truck therefrom for travel on rails on which said driving wheels are supported, a pair of blocks disposed one above the other and respectively mounted on said motor truck and substantially the central portion of said pilot truck, and a vertically projecting cylindrical boss formed on one of said blocks, the other of said blocks having therein a cylindrical recess in which the outer portion of said boss is journalled with vertical clearance from the inner end of said recess.

5. A combination rail and highway vehicle including, a motor truck having the usual rubber tired driving wheels laterally spaced apart to roll upon a pair of rails, a flanged wheeled pilot truck disposed closely adjacent said driving wheels and toward one end of said motor truck therefrom for travel on rails on which said driving wheels are supported, a pair of blocks disposed one above the other and respectively mounted on said motor truck and substantially the central portion of said pilot truck, said blocks being respectively provided with registering vertical apertures, and a pin removably carried in said apertures.

6. A combination rail and highway vehicle including, a motor truck having the usual rubber tired driving wheels spaced apart laterally to roll upon a pair of rails, a flanged wheeled pilot truck disposed closely adjacent said driving wheels and toward one end of said motor truck therefrom for travel on rails on which said driving wheels are supported, a pair of blocks disposed one above the other and respectively mounted on said motor truck and substantially the central portion of said pilot truck, a vertically projecting cylindrical boss formed on one of said blocks, the other of said blocks having therein a cylindrical recess whereinto said boss projects in journalled relation, said blocks having therein registering respective apertures disposed axially of said boss and recess, and a pin removably carried in the apertured portions of said respective blocks.

WARREN W. RABEY.